March 3, 1970     A. A. BAUERS     3,498,632
REACHPOLE TRAILER CHASSIS WITH ROCKING BOLSTER
Filed Oct. 4, 1967     3 Sheets-Sheet 1

INVENTOR
ARTHUR A. BAUERS
BY
Olsen and Stephenson
ATTORNEYS

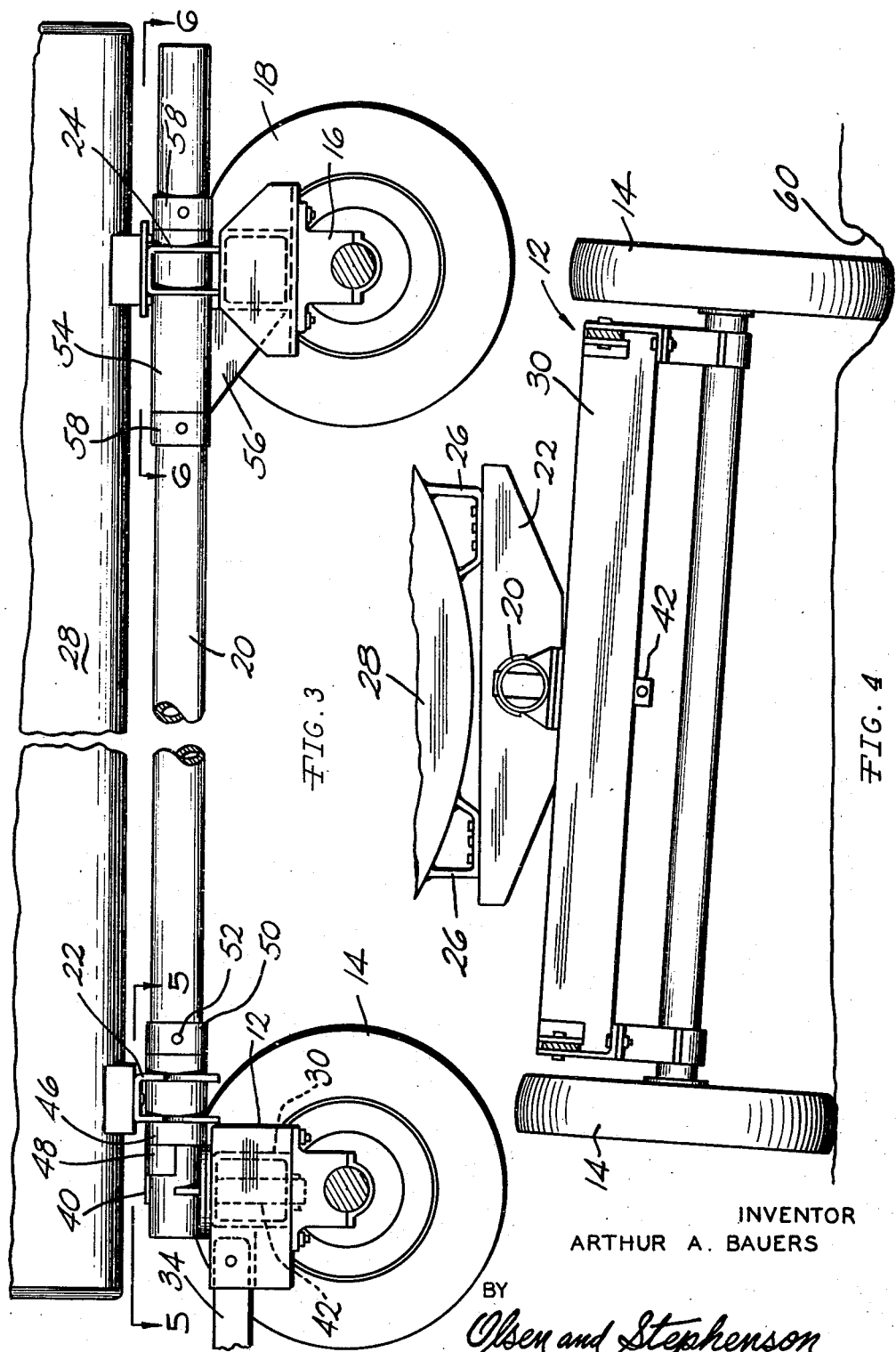

March 3, 1970     A. A. BAUERS     3,498,632
REACHPOLE TRAILER CHASSIS WITH ROCKING BOLSTER
Filed Oct. 4, 1967     3 Sheets-Sheet 3
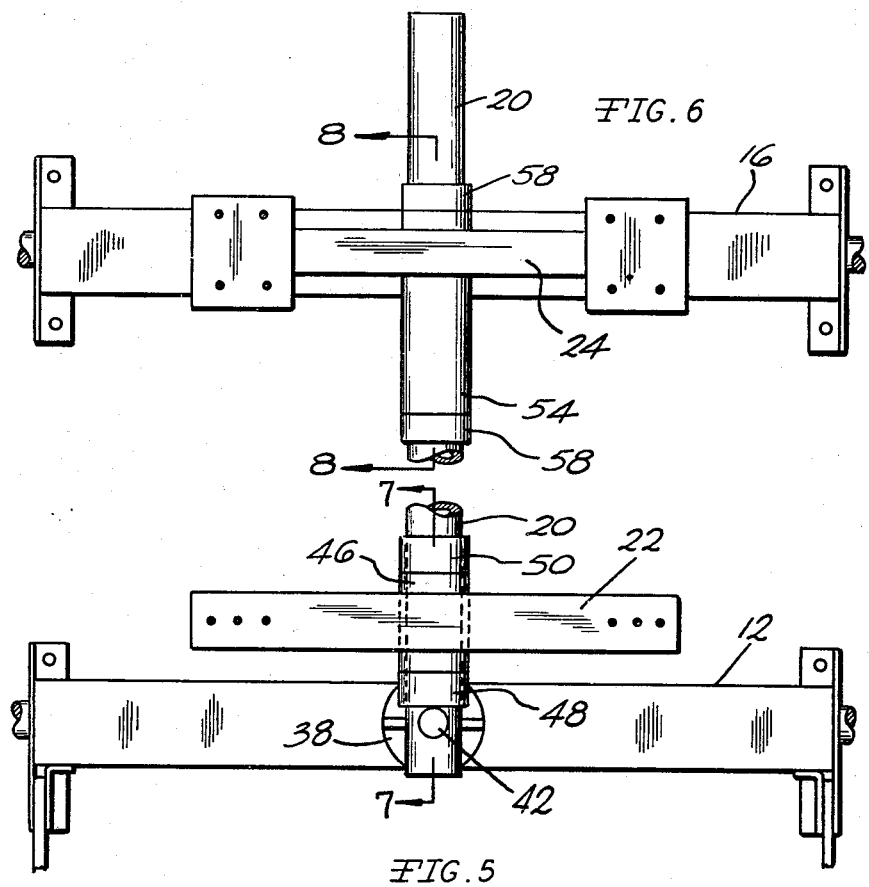
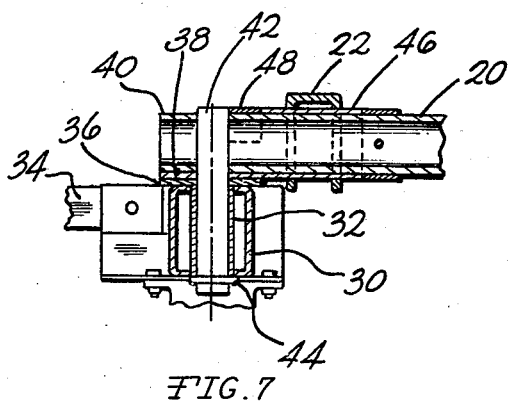
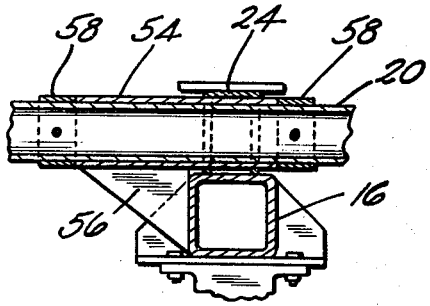
INVENTOR
ARTHUR A. BAUERS
BY
*Olsen and Stephenson*
ATTORNEYS United States Patent Office 3,498,632
Patented Mar. 3, 1970

3,498,632
REACHPOLE TRAILER CHASSIS WITH
ROCKING BOLSTER
Arthur A. Bauers, Beatrice, Nebr., assignor to Hoover
Ball and Bearing Company, Saline, Mich., a corporation of Michigan
Filed Oct. 4, 1967, Ser. No. 672,807
Int. Cl. B60g 9/02
U.S. Cl. 280—141                          8 Claims

ABSTRACT OF THE DISCLOSURE

A trailer chassis of reachpole type wherein the reachpole is used as a structural load support. A front rocking bolster is pivotally supported directly on the reachpole at a position adjacent the front axle of the chassis.

BACKGROUND OF THE INVENTION

Reachpole trailer chassis are well known. In a chassis of this type, a tubular member, commonly termed a "reachpole," constitutes the sole connection between the front and rear axles of the chassis. Trailers of this type have also employed rocking bolsters, a rocking bolster being a load supporting member mounted for rocking movement about an axis parallel to the axis of the reachpole. One known trailer of this type has the rocking bolster mounted on a pivot carried by a swivel plate which is in turn mounted on the front axle for swivelling movement about a vertical axis. Trailer chassis of this type usually require resilient front axle assemblies which enable relative up and down movement of the trailer front wheels.

SUMMARY OF THE INVENTION

In the trailer chassis of this invention, the rocking front bolster is pivotally supported directly on the reachpole at a position adjacent the front axle. This arrangement thus makes use of the capability of the reachpole for carrying vertical loads and enables use of the reachpole as a pivot support. Thus, the rocking bolster construction is greatly simplified and its load carrying capabilities are improved. Furthermore, this arrangement allows practically unlimited pivotal movement of the front axle relative to the tank or body normally supported on the chassis bolsters so that the trailer has improved capability for movement over rough terrain without damaging the chassis.

It is an object of this invention, therefore, to provide an improved reachpole trailer chassis with rocking bolster.

Further objects, features and advantages of this invention will become apparent from a consideration of the following description, the appended claims, and the accompanying drawing in which:

FIGURE 3 is a foreshortened longitudinal sectional view of the trailer chassis of this invention as viewed from substantially the line 3—3 in FIG. 1;

FIGURE 4 is a front elevational view of the trailer chassis of this invention, illustrating the ability of the rocking front bolster to maintain the load in a horizontal position when the chassis front wheels are at relatively different elevations;

FIGURES 5 and 6 are fragmentary sectional views of the chassis of this invention as viewed from substantially the lines 5—5 and 6—6 in FIG. 3; and FIGURES 7 and 8 are detail sectional views of the chassis of this invention as seen from the lines 7—7 and 8—8 in FIGS. 5 and 6, respectively.

Figure 1:
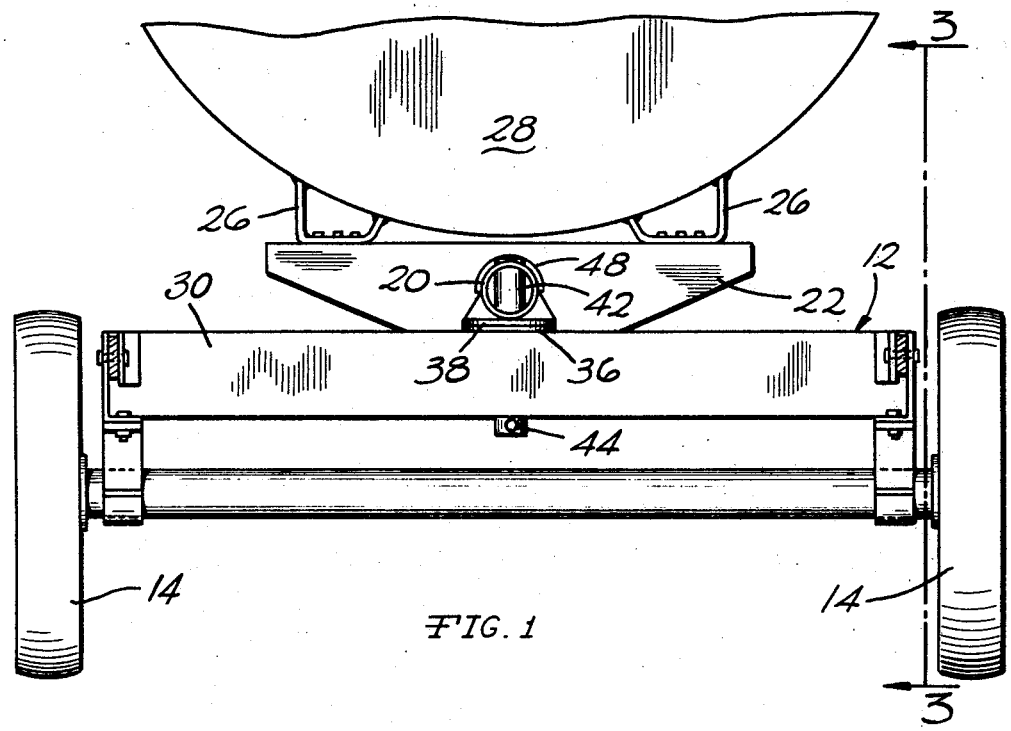
FIGURE 1 is a front elevational view of the trailer chassis of this invention.
Figure 2:
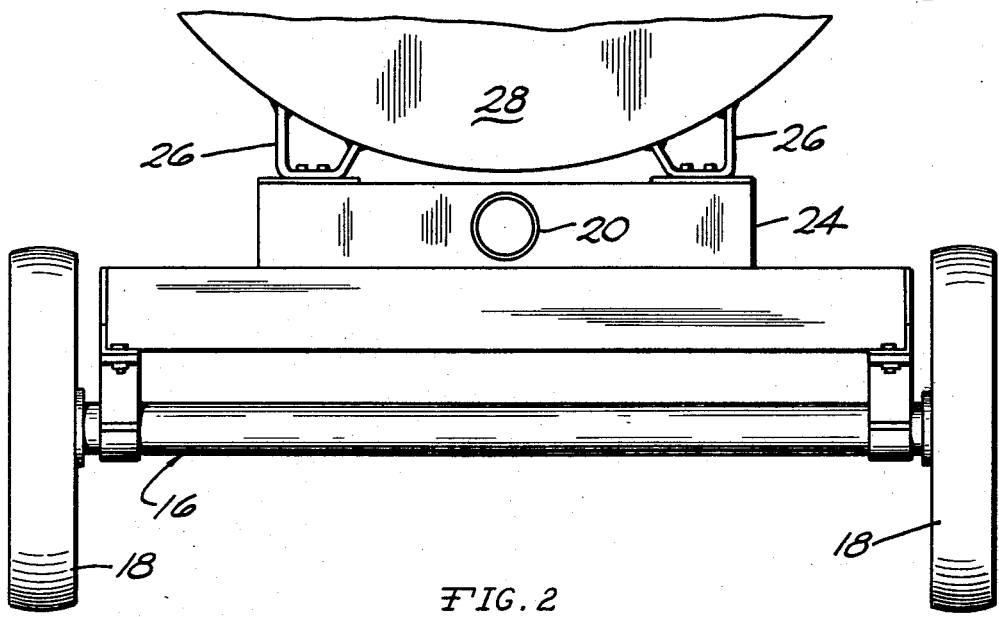
FIGURE 2 is a rear elevational view of the trailer chassis of this invention.

With reference to the drawing, the chassis of this invention indicated generally at 10, is illustrated in FIG. 3 as including a front axle assembly 12 on which front ground wheels 14 are supported, a rear axle assembly 16 on which rear ground wheels 18 are supported, and a reachpole 20 which is connected to and extended between the front and rear axles 12 and 16, respectively. A front rocking bolster 22 (FIGS. 1 and 3) is pivotally or rockably supported on the reachpole 20 at a position adjacent the front axle assembly 12 and a rear bolster 24 is rigidly mounted on the top side of the rear axle assembly 16, as shown in FIGS. 2 and 3. In the illustrated embodiment of the invention, brackets 26 are employed for supporting a tank 28 on the bolsters 22 and 24, but it is to be understood that other forms of load carrying containers, such as boxes or bodies, can be supported in any suitable manner on the bolsters 22 and 24.

The front axle assembly 12 includes a transversely extending box shape beam 30 in which a tubular socket 32 (FIG. 7) is supported and to which the usual chassis tongue assembly 34 is attached. A swivel plate 36 is secured to the top side of the beam 30 at a position surrounding the tubular socket 32, and a similar swivel plate 38 is mounted on the bottom side of the reachpole 20 at its front end 40. A kingpin member 42 is secured to the front end of the reachpole 20 so that it extends downwardly through the swivel plate 38. As a result, the kingpin 42 is movable to the position shown in FIG. 7 in which it extends downwardly through the socket 32 when the swivel plate 38 is supported in bearing engagement on the swivel plate 36. A removable pin 44 extends through the kingpin 42 for maintaining it in supported position in the socket 32. Thus, the front axle assembly 12 can be pivoted in a horizontal plane about the kingpin 42 to enable steering of the trailer chassis 10.

The front bolster 22 is secured to a tubular sleeve 46 (FIGS. 3 and 5) and the sleeve 46 is telescoped over the reachpole 20 so as to pivotally support the front bolster 22 on the reachpole 20. As shown in FIG. 3, the reachpole 20 is of a relatively large diameter to thus provide an unusually large bearing area for the bolster supporting sleeve 46. To prevent the sleeve 46 from moving in a direction axially of the reachpole 20, the front end of the sleeve 46 is positioned in bearing engagement with a half collar 48 which is secured to the reachpole 20 adjacent the kingpin 42. A locking collar 50, telescoped over the reachpole 20 and held in place by suitable means such as a pin 52, engages the opposite end of the sleeve 46.

The rear bolster 24 is rigidly secured to the rear axle assembly 16 and supports a longitudinally extending tubular support 54 telescoped over the reachpole 20 adjacent its rear end. A reinforcing gusset plate 56 is secured to and extends between the rear axle assembly 16 and the tubular support 54. Locking collars 58, like the collar 50 are mounted on the reachpole 20 in engagement with opposite ends of the tubular support 54 for preventing axial movement of the reachpole 20 relative to the support 54.

It can thus be seen that the reachpole 20 constitutes the sole structural connection, in the chassis 10, between the front and rear axles 12 and 16. In addition, the reachpole 20 forms the pivot support for the rocking front bolster 22, with the front bolster 22 being located adjacent the kingpin 42 so as to minimize the bending moment transmitted to the reachpole by the bolster 22. Thus, a rugged chassis 10 is achieved with a minimum number of structural components.

In operation of the chassis 10 to carry the load 28 over a rough terrain, it can be seen from FIG. 4 that the front ground wheels 14 can move through ruts, chuck holes, or the like, indicated at 60, without affecting the substantially horizontal disposition of the tank 28 and the front bolster 22. Thus, the chassis 10 is particularly useful for carrying tanks of fertilizer over farm fields. By virtue of the fact that the front axle assembly 12 can pivot through a very large angle relative to the front bolster 22, the conventional shock absorbing type of front axle normally employed on chassis of this type does not necessarily have to be used with the chassis 10. This enables manufacture of the chassis 10 with a reachpole 20 which is of larger than usual diameter while still achieving a chassis 10 of reduced cost relative to those previously employed.

It will be understood that the reachpole trailer chassis with rocking bolster which is herein disclosed and described is presented for purposes of explanation and illustration and is not intended to indicate limits of the invention, the scope of which is defined by the following claims.

What is claimed is:

1. In a trailer chassis having front and rear axle assemblies, a tubular reachpole extending between said front and rear axle assemblies, means connecting said reachpole to said axle assemblies, a bolster separate from said axle assemblies and adapted to support a load, and means pivotally mounting said bolster on said reachpole adjacent said front axle assembly so that said bolster is rotatable about the longitudinal axis of said reachpole.

2. A trailer chassis according to claim 1 wherein said means connecting said reachpole to said axle assemblies includes coacting kingpin and socket means on said reachpole and said front axle assembly.

3. A trailer chassis according to claim 2 wherein said coacting kingpin and socket means includes a downwardly extending kingpin members secured to said reachpole and upright tubular socket member supported on said front axle assembly and telescoped about said kingpin member.

4. A trailer chassis according to claim 3 wherein said means pivotally mounting said bolster on said reachpole includes a tubular sleeve rotatably mounted on said reachpole at a position adjacent said kingpin and between said front and rear axle assemblies.

5. A trailer chassis according to claim 4 further including stop members secured to said reachpole at positions engaging opposite ends of said sleeve for preventing movement of said sleeve axially of said reachpole.

6. A trailer chassis according to claim 2 wherein said means connecting said reachpole to said axle assemblies further includes a tubular support mounted on said rear axle assembly and telescoped about said reachpole.

7. A trailer chassis according to claim 6 further including stop means on said reachpole engaging opposite ends of said tubular support for preventing movement of said reachpole axially of said support.

8. A trailer chassis according to claim 7 further including a second bolster adapted to support a load, said second bolster being mounted on said rear axle and having said tubular support extended therethrough.

References Cited

UNITED STATES PATENTS

| | | | |
|---|---|---|---|
| 2,766,053 | 10/1956 | Madruga | 280—106.5 X |
| 2,361,869 | 10/1944 | Randall | 280—141 |
| 1,223,152 | 4/1917 | Cove | 280—141 |

FOREIGN PATENTS

| | | |
|---|---|---|
| 1,184,188 | 2/1959 | France. |

PHILIP GOODMAN, Primary Examiner